United States Patent
Alken et al.

(10) Patent No.: US 11,717,869 B2
(45) Date of Patent: Aug. 8, 2023

(54) SEAL TO PREVENT LUBRICANT ESCAPING, AND ROLLING STAND HAVING SAID SEAL

(71) Applicant: SMS group GmbH, Düsseldorf (DE)

(72) Inventors: Johannes Alken, Siegen (DE); Daniel Knie, Freudenberg (DE); Andrej Tucak, Wenden-Brün (DE); Ralf Seidel, Dillenburg (DE); Matthias Kipping, Herdorf (DE)

(73) Assignee: SMS group GmbH, Düsseldorf (DE)

( * ) Notice: Subject to any disclaimer, the term of this patent is extended or adjusted under 35 U.S.C. 154(b) by 461 days.

(21) Appl. No.: 16/762,268

(22) PCT Filed: Nov. 2, 2018

(86) PCT No.: PCT/EP2018/079984
§ 371 (c)(1),
(2) Date: May 7, 2020

(87) PCT Pub. No.: WO2019/091861
PCT Pub. Date: May 16, 2019

(65) Prior Publication Data
US 2021/0170461 A1    Jun. 10, 2021

(30) Foreign Application Priority Data
Nov. 9, 2017    (DE) .................... 10 2017 219 935.0

(51) Int. Cl.
*B21B 31/07*    (2006.01)
*F16C 13/02*    (2006.01)
(Continued)

(52) U.S. Cl.
CPC ............ *B21B 31/074* (2013.01); *F16C 13/02* (2013.01); *F16C 2322/12* (2013.01); *F16J 15/164* (2013.01); *F16J 15/441* (2013.01)

(58) Field of Classification Search
CPC .... F16J 15/441; F16J 15/164; F16C 2322/12; F16C 13/02; B21B 31/074
See application file for complete search history.

(56) References Cited

U.S. PATENT DOCUMENTS 3,814,446 A * 6/1974 Derman ............... F16J 15/3456
277/366
3,912,345 A * 10/1975 Overton ............... F16C 19/385
29/898.07

(Continued)

FOREIGN PATENT DOCUMENTS

| DE | 102013224117 A1 | 5/2015 |
| DE | 102015209637 A1 | 12/2016 |
| EP | 3098486 A1 | 11/2016 |

*Primary Examiner* — Eugene G Byrd
*Assistant Examiner* — L. Susmitha Koneru
(74) *Attorney, Agent, or Firm* — Smartpat PLC

(57) ABSTRACT

A seal (100) for sealing a lubricant space prevents lubricant (320) escaping. A rolling stand has a seal of this kind. The seal (100) is made at least partially from elastic material. To enable a pressing force FR, with which the bottom face (112) of the seal is pressed against an opposite contact surface (218), for example of a roll journal (212), to be variably set, the seal (100) has at least two cavities, which are separated from each other in the circumferential direction and which are open towards the lubricant space of the bearing.

17 Claims, 3 Drawing Sheets

(51) Int. Cl.
 *F16J 15/16* (2006.01)
 *F16J 15/44* (2006.01)

(56) References Cited

U.S. PATENT DOCUMENTS

| | | | | |
|---|---|---|---|---|
| 4,426,090 | A * | 1/1984 | Bender | F16C 33/72 |
| | | | | 384/477 |
| 5,033,872 | A * | 7/1991 | Ueno | F16C 11/0614 |
| | | | | 384/209 |
| 5,169,159 | A * | 12/1992 | Pope | F16J 15/441 |
| | | | | 277/422 |
| 5,558,341 | A * | 9/1996 | McNickle | F16J 15/3488 |
| | | | | 277/400 |
| 6,145,843 | A * | 11/2000 | Hwang | F16J 15/442 |
| | | | | 277/400 |
| 10,443,655 | B2 * | 10/2019 | Becker | F16C 33/7856 |
| 2017/0009889 | A1 | 1/2017 | Seki et al. | |
| 2017/0157656 | A1 | 6/2017 | Alken et al. | |
| 2018/0297093 | A1 | 10/2018 | Alken et al. | |

* cited by examiner

SEAL TO PREVENT LUBRICANT ESCAPING, AND ROLLING STAND HAVING SAID SEAL

TECHNICAL FIELD

The disclosure relates to a seal for sealing a lubricant space to prevent lubricant escaping. Furthermore, the disclosure relates to a rolling stand with such a seal.

BACKGROUND

Ring seals with cavities for realizing dynamic sealing depending on the pressure in the annular- or lubricant gap of a bearing are known e.g. from U.S. Pat. No. 5,169,159 or EP 3 098 486 A1.

In principle, seals and rolling stands are known in the prior art, for example from the German application publications DE 10 2013 224 117 A1 or DE 10 2015 209 637 A1. Both application publications disclose a rolling stand with at least one roller for rolling particularly metallic rolled material. The roller has two roll journals and one roller body. The rolling stand is equipped with chocks—here, for example, with one bearing bush each—for rotatably supporting the roller in the rolling stand. Each of the chocks or the bearing bushes spread out a receiving opening to receive one of the roll journals, optionally with a drawn-on journal bush. An annular gap is formed between the roller and the chock for receiving a lubricant. The annular gap is sealed at both the end on the side of the body and the end remote from the body by a ring seal detachably attached to the bearing bush. The ring seal is designed in such a manner that it prevents or reduces lateral outflow of lubricant from the annular gap within a predetermined circumferential angular range. Sealing systems known from the prior art, such as radial shaft seals or labyrinth seals, have been used for this purpose.

However, all sealing systems used or tried out proved to be unsuitable for the following reasons: The preload with which the ring seal is pressed in a radial direction onto the roll journal or journal bush is determined by the design of the rolling stand. The preload does not adapt to the pressure, which varies in time and place, of the lubricant acting in the annular gap. The consequence is that if the predetermined preload is too low, the annular gap is only inadequately sealed; that is, leakage arises. In the reverse case, that is, if the predetermined preload is too high, there is increased friction between the seal and the roll journal or journal bush, resulting in excessive wear of the seal. Such increased wear can quickly lead to the destruction of the seal. In addition, if the preload is too high, the seal may be destroyed by extrusion into an annular gap at low or atmospheric pressure. The seal typically does not extrude into the annular gap between the roll journal and the chock, because a very high counter-pressure prevails there. Instead, there is a risk that the seal will extrude in the opposite direction, because no counter-pressure prevails there.

Ring seals for sealing ring gaps in rolling stands, each of which has a circumferential groove open towards the ring gap on its side surfaces turned towards the ring gap, are also known.

However, the pressure in such circumferential groove—and thus the sealing effect of the ring seal—is the same in all circumferential angular ranges, because the pressure is equalized over the circumference. As such, this well-known ring seal with a circumferential groove is not suitable for taking account of the different pressure conditions acting in individual circumferential angular ranges by means of sealing effects of different strengths.

SUMMARY

The invention is based on the object of further developing a seal in a known rolling stand in such a manner that the pressing force with which the seal is pressed against a surface in the rolling stand, for example, the surface of the journal bush or roll journal, is suitably adapted or adjusted to the local pressure conditions in the annular gap to be sealed.

This object is achieved with a seal that has at least two cavities separated from each other in the circumferential direction, which are open towards the lubricant space of the oil film bearing for feeding the lubricant from the lubricant space of the bearing to be sealed into the cavities.

Within the framework of the present disclosure, the term "bearings" means in particular—but not exclusively—oil film bearings.

In the present disclosure, a distinction is made between two types of annular gaps, hereinafter also referred to as lubricant spaces:

A first annular gap or lubricant space is part of the actual bearing, in particular an oil film bearing; as such, it is also referred to as the annular gap or lubricant space of the bearing in the following. It is formed between the bearing bush and the journal bush. If the rolling stand is designed without a bearing bush and a journal bush, it is located between the chock and the roll journal. The lubricant in such first annular gap supports the entire load during a rolling operation, at least in places.

A second annular gap or lubricant space is not part of the actual bearing, but adjoins it. In the following, it is also called an annular gap or a lubricant space under the seal. It is located between the bottom face of the seal and the opposite journal bush or roll journal. If the first annular gap is sealed on both sides by one seal each, there are two second annular gaps under the seals per roll in a rolling stand.

Both annular gaps or lubricant spaces are in a fluid-conducting connection with each other. However, the radial height and thus the volume of the first annular gap is significantly greater than that of the second annular gap. For this reason, the lubricant in the first annular gap is under a much higher pressure during the operation of the rolling stand than in the second annular gap. However, it is typically the case that the pressure in the first annular gap is distributed differently over the circumference.

Due to the claimed fluid-conducting connection, each of the cavities in the seal is individually fluid connected in a fluid-conducting manner to the pressurized lubricant space of the bearing. The seal does not include a circumferential groove to connect the cavities. Consequently, when the seal is used, the cavities independently fill with the lubricant, and the cavities are also subjected to the same circumferentially and temporally varying pressure as the lubricant in the lubricant space of the bearing. Due to the elasticity of the material from which the seal is made, the cavities expand to a greater or lesser extent depending on the strength of the pressurization. Due to the isotropic properties of the sealing material, the expansion of the cavities leads to an increase in the volume of the seal and thus automatically to an increase in the pressing force with which the seal acts on a surface to be sealed, in particular a journal bush or a roll journal. Under variable pressure conditions, the volume of the seal and the pressing force varies accordingly. In other words: Due to the claimed design of the seal, it is advantageously achieved that the pressing force is distributed over the circumference with the pressure conditions in the lubricant space of the bearing and varies over time, or that the pressing force automatically adapts itself in a suitable manner to the pressure conditions in the lubricant space. The adaptation of the pressing force to the pressure conditions, differing in the circumferential direction, in the lubricant space of the bearing is achieved in the seal in particular by the fact that no circumferential groove, but a plurality of cavities formed separately from one another in the circumferential direction, are provided, which cavities are in a fluid-conducting connection with the lubricant space of the bearing in different circumferential areas.

For the functioning of the seal, it is important, as already mentioned, that the lubricant and the pressure to which it is exposed can enter the cavities; this means that there must be a fluid-conducting connection between the cavities and the pressurized lubricant space of the bearing. Such fluid-conducting connection can be realized, for example, either by the cavities being formed as a recess on the surface of the seal and opening towards the lubricant space of the bearing, and/or by the cavities on the surface or in the interior of the seal opening into the lubricant space of the bearing via feed channels. With both variants, the cavities are in a fluid-conducting or pressure-conducting connection with the lubricant in the lubricant space of the bearing.

By profiling the bottom face of the seal, the properties of the lubricating film in the second annular gap between the seal and the contact surface of the journal bush or roll journal can be adjusted.

The individual cavities in the seal can be of different shapes and sizes; preferably, they are designed differently in groups. The size and shape of the cavities can also be used to control the strength of the pressing force. The larger the cavities, the greater the achievable increase in volume of the seal and thus the achievable pressing force and vice versa.

In accordance with an additional exemplary embodiment, the individual separate cavities in the seal are preferably evenly distributed over the length or circumference of the seal. This offers the advantage that the seal has the same properties in every circumferential angular position and thus—assuming the same pressure—the same sealing effect can be achieved.

For the use of the seal in rolling stands for sealing annular gaps, that is, annular lubricant gaps of bearings, it is advisable to design the seal as a ring seal. When designed as a ring seal, the bottom or sealing face of the seal is typically formed on the inner side of the ring seal, that is, in a manner turned towards the center or center point of the ring seal. This ensures that the sealing face is turned towards the outer surface of the roll journals, particularly when using the seal on roll journals.

With regard to the rolling stand, the aforementioned object of the invention is achieved by a rolling stand which uses the disclosed seal, wherein the annular gap represents the lubricant space.

The advantages of the rolling stand designed in this manner essentially correspond to the advantages mentioned above with regard to the seal. The surface of the roll journal now forms the contact surface against which the seal is pressed with its bottom face. As described above, due to the particular structural design of the seal, the pressing force is now automatically adapted to the possibly very high pressure level in the annular gap between the roll journal and the chock, or in the annular gap between the roll journal and the bottom face of the seal.

Such variation in question of the pressing force as a function of the pressure conditions in the annular gap can be superimposed on a pre-adjusted preload, with which the bottom face of the seal presses against a contact surface. The total radial pressing force achieved in this manner by the superimposing of the preload and variable pressing force must be balanced or adjusted such that it is not too great, on the one hand, and not too small, on the other hand. The total pressing force must not become too high, because a lubricating film must be maintained between the bottom face of the seal and the contact surface of the rotating roll journal, in order to prevent solid body friction between the seal and the rotating roll journal. Solid body friction would result in the seal wearing out and thus becoming permanently unusable or destroyed. On the other hand, the total sealing force must also not be too small such that the thickness of the lubricating film is significantly less than the thickness/height of the first annular gap between the roll journal and the chock. Only if the thickness of the lubricating film in the second annular gap is significantly less than the thickness of the lubricating film in the first annular gap can the seal also provide the desired—not absolute, but extensive—sealing effect.

Particularly with hydrodynamic oil film bearings, it is typically the case that a complete sealing is not desired; rather, only sealing in a certain circumferential angular range, specifically where the smallest lubricating film thickness occurs, is desired. For this reason, the seal does not necessarily have to be designed as a full circumferential ring seal; rather, a sealing strip or ring segment of limited length in the circumferential angular range in question is sufficient for the application in question.

A groove which is open towards the roll journal is formed at the end proximal to the roller body at the end remote from the roller body of the chock or bearing bush at the claimed rolling stand. The groove is advantageously used to receive the ring seal.

For example, the axial outer side of the groove, that is, the outer side of the groove turned away from the bearing bush, can be formed by a perforated disk that can be detachably connected to the chock or the bearing bush, for example by screwing. If the width of the ring seal in the unloaded state is greater than the width of the groove in the axial direction, the preload force with which the seal acts on the roll journal in the radial direction can be adjusted by screwing on the perforated disk. The reason for this is that the elastic seal expands isotropically, that is, also in the radial direction, when clamped in the axial direction in the groove. As a function of the pressure exerted by the screw connection in the axial direction, the preload force in question can also be adjusted in the desired manner.

In order to compensate for manufacturing tolerances in the seal and to ensure that the axial width of the seal is at least slightly larger than the width of the annular groove in any event, it is advantageous if the ring seal has at least one superelevation on its end face turned towards the chock and/or on its end face turned away from the chock.

As already mentioned above, the recesses or cavities open directly into those surface areas of the seal that bound the pressurized lubricant space of the bearing. Alternatively or additionally, additional recesses can be formed on those areas of the surface of the seal that, when the seal is clamped in the groove, are pressed against its walls or the bottom of the groove and are thus sealed by the pressure. Such additional recesses or cavities are then preferably in a fluid-conducting connection with the lubricant space of the bearing via the feed channels.

On its end face turned towards the ring seal, the chock or the bearing bush can have pins protruding preferably in the axial direction. Such pins are arranged in such a manner that they engage in the recesses in question on the surface of the seal. The pins are advantageously used, on the one hand, to prevent the seal from twisting, particularly during the rolling operation, and, on the other hand, to limit the deformation of the seal. A further possibility is the radial arrangement of the pins with the same function.

The volume of the recesses can be larger than the volume of the pins that protrude in the installed state of the seal. Such design has the advantage that, despite the fact that the pins protrude into the recesses, a residual cavity remains which, when connected to the annular gap by a feed channel, can function as a cavity within the meaning of the present disclosure.

A design of the inner diameter of the ring seal larger than the outer diameter of the roll journal—optionally with a drawn-on journal bush—at the axial height of the ring seal has the advantage that the bearing formed by the chock with the roll journal mounted therein can be operated as an oil film bearing. The prerequisite for this is that the ring seal reduces the annular gap between the bottom face and the contact surface to the lubricating film in question only in a limited circumferential angular range where the minimum lubricating film density prevails, while the seal does not have to achieve a significant sealing effect in the remaining circumferential angular range. In the area of the minimum lubricating film thickness, the total pressing force is maximized, and thus the annular gap is reduced down to the lubricating film. In the remaining circumferential angular range, the pressing force is negligible and the lubricant can escape from the annular gap there in the axial direction due to the overdimensioning of the ring seal past it. For operation as an oil film bearing, this is the intention.

BRIEF DESCRIPTION OF THE DRAWINGS

The description is accompanied by 5 figures, wherein the following are shown

DETAILED DESCRIPTION

The invention is described in detail below with reference to the figures mentioned in the form of exemplary embodiments. In all figures, the same technical elements are marked with the same reference signs.

Figure 1:
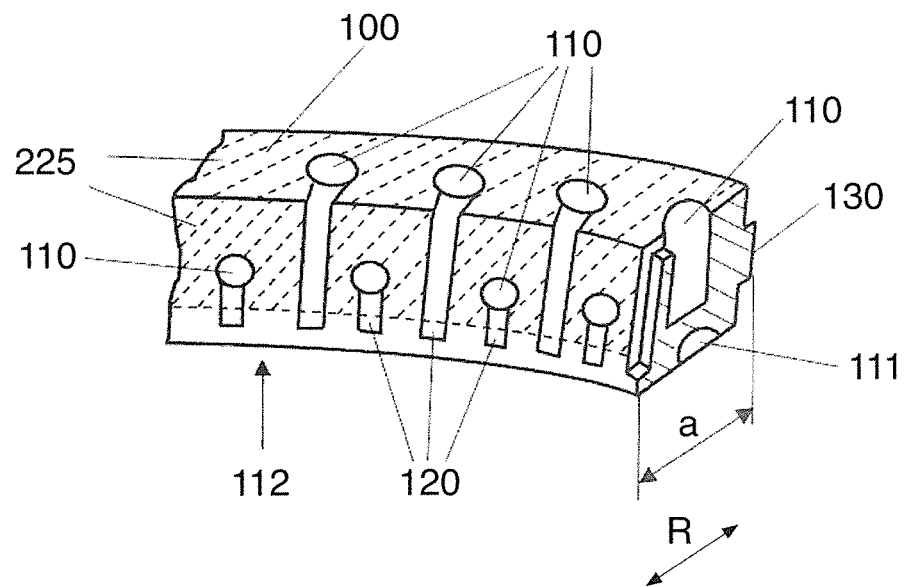
FIG. 1 shows the seal in accordance with the disclosure.

FIG. 1 shows the seal 100 designed in accordance with the disclosure. It can be used to seal a lubricant space (not shown in FIG. 1) to prevent lubricant escaping. It is at least partially made of an elastic material and has a plurality of cavities 110 of any arbitrary shape in its interior. The cavities 110 are shown in FIG. 1 only as examples as cylindrical recesses 110, which are open towards the surface of the seal. Alternatively, the cavities 110 can also be formed completely in the interior of the seal; they are then connected to the surface of the seal in a fluid-conducting manner via feed channels 120. The feed channels are used to feed the lubricant from the lubricant space 300 of a bearing, in particular an oil film bearing, into the respective cavities 110.

In FIG. 1, the lower side of the seal 100 forms a bottom face 112, with which the seal is pressed against a contact surface of a typically moving object, for example a roll journal.

At least to a large extent, the recesses or the feed channels 120 open into a first lubricant space 300 of the bearing to be sealed. In this manner, it is ensured that the lubricant and the pressure from the first annular gap 300 is transferred to the cavities. The pressure from the lubricant space, which may vary, is then always adjusted in the cavities. With regard to the purpose of this, please refer to the above explanations in the general part of the description.

The reference number 225 and the hatching indicate wall areas of a groove in which the seal can typically be inserted. Such wall areas then cover most of the surface of the seal. Only the feed channels and/or recesses on the non-overlaid areas of the surface of the seal are in in a fluid-conducting connection with the first lubricant space 300; see also FIG. 4.

As shown in FIG. 1, the recesses 110 may also be open to surface sections of the seal other than the lubricant compartment 300. This is particularly advantageous for the interaction of such recesses with the pins on the chock described below.

FIG. 1 also shows an example of a first group of recesses 110 and a second group of recesses 110, wherein the volume of the recesses of the first group is larger than the volume of the recesses of the second group. The different volumes bring about a different expansion of the seal and thus possibly a different proportion of a sealing force exerted by the seal at the same supplied pressure.

The seal in FIG. 1 has a width a; such width corresponds to the width of the bottom face 112 as an example. It can also be seen that the seal has an exemplary rectangular cross-section. The separate cavities 110 or recesses 110 are preferably arranged in a manner evenly distributed over the length or circumference of the seal. This has the advantage that the seal 100 therefore has the same properties at every point or length section. For sealing cylinders, such as a roll journal 212, the seal 100 can be designed in ring shape as a ring seal; see FIG. 5. The bottom face 112 is then designed to be turned towards the center or center point of the ring seal or in other words the surface or contact surface of the cylinder; see FIG. 5.

Figure 2:
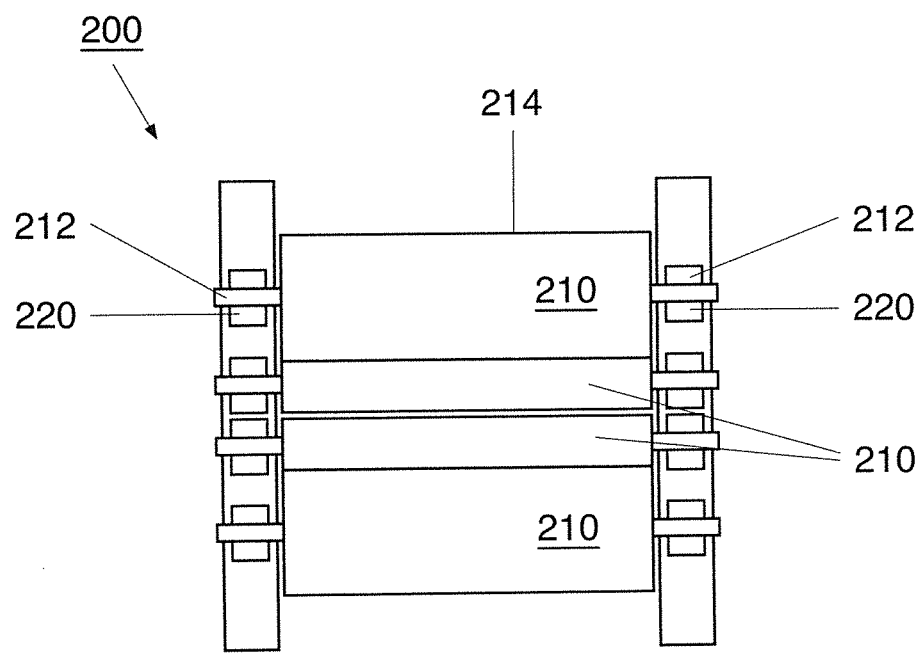
FIG. 2 shows a rolling stand from the prior art.

FIG. 2 shows a rolling stand according to the prior art. The rolling stand 200 has at least one roll 210 (here, as an example, four rollers 210), each with two roll journals 212 and one roller body 214. In particular, the two central work rollers shown in FIG. 2 are used for rolling rolled material. Each of the rollers 210 is rotatably mounted with its roll journals 212 in a chock 220, also called a bearing housing.

Figure 3:
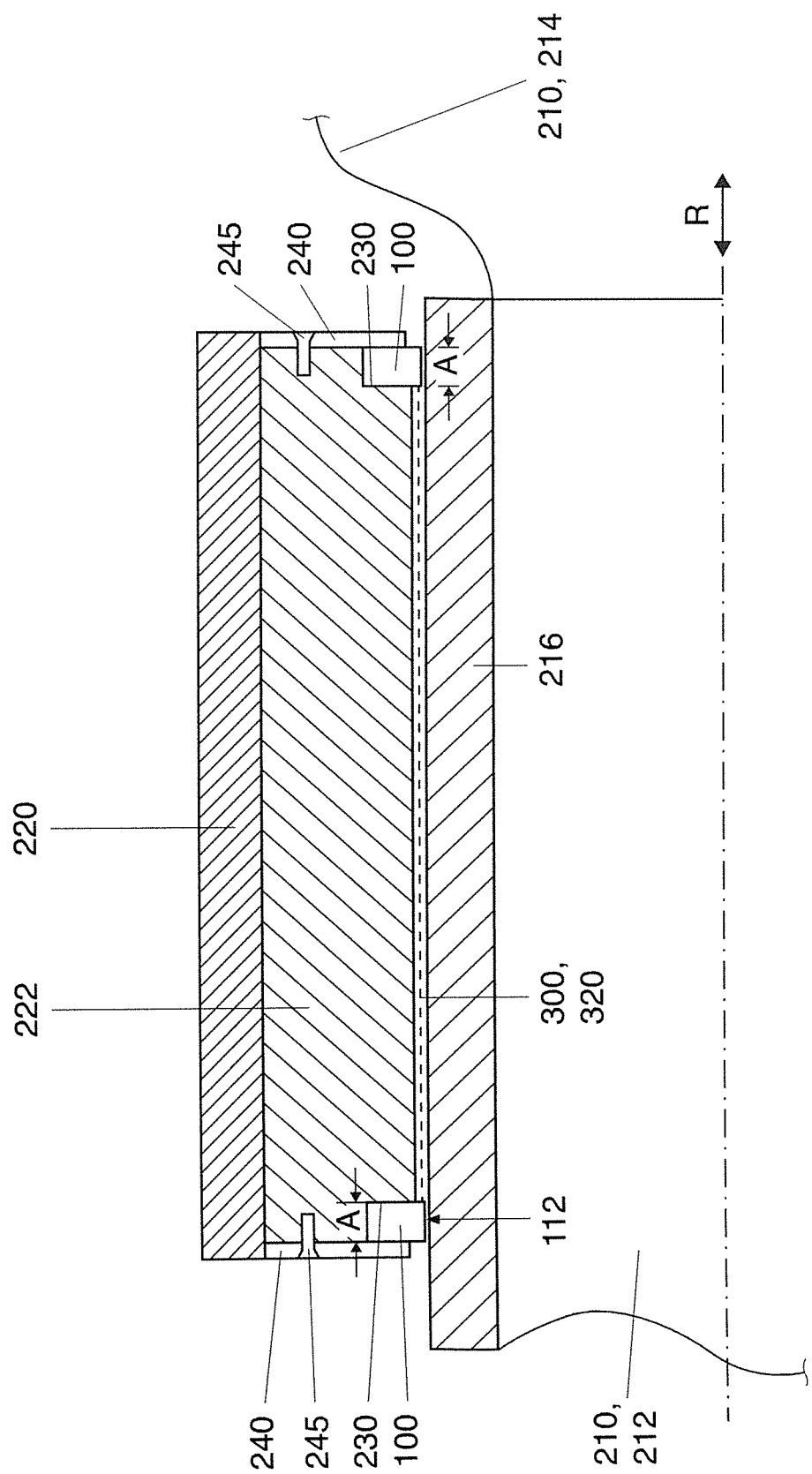
FIG. 3 shows the bearing arrangement of a roller in a chock.

FIG. 3 shows such bearing arrangement in detail in a longitudinal section. The roller 210 with its roll journal 212 and roller body 214 can be seen. A journal bush 216 is drawn on the roll journal. The roll journal with the journal bush is mounted in a receiving opening, which is spread out by a bearing bush 222. The bearing bush 222 is arranged in a non-rotatable manner in the chock 220. An annular gap 300 is formed between the bearing bush 222 arranged in a non-rotating manner and the journal bush 216 rotating with the roll journal 212, which annular gap is filled with lubricant 320 during the operation of the rolling stand. In the annular gap, the lubricant is then under high pressure, typically of several 100 bar. In FIG. 3, the annular gap 300 is sealed in an exemplary manner both at its end on the roller body side and at its end remote from the roller body by the ring seal 100. The ring seal 100 does not have to be designed over its entire circumference; in principle, only one section of the ring seal can be designed accordingly.

It can also be seen in FIG. 3 that the bearing bush 222 has a groove 230 at its end on the roller body side and at its end remote from the roller body, which each is open towards the roll journal 212 and into which the ring seal 100 is inserted. In the example shown in FIG. 3, the outer sides of the two grooves 230 are not formed by the bearing bush 222. Rather, each of the outer sides of the grooves there is formed by perforated disks 240, which are screwed to the bearing bush 222 with screws 245. Since the width a of the ring seal 100 in unloaded state and, if applicable, taking into account the superelevations 130, see FIG. 1 in the axial direction R, is intentionally designed slightly larger than the width A of the groove, which is structurally specified by the bearing bush 222, it is possible that, by tightening the screws 245, the axial force with which the ring seals 100 are squeezed in the groove can be variably adjusted. Due to the isotropic behavior of the material of the seal 100, the axial crushing or compression not only reduces the width of the ring seal, but also causes the ring seal to expand in the radial direction. For this reason, a variation in the axial clamping force automatically causes a variation in the preload or radial pressing force with which the bottom face 112 of the seal 100 is pressed against the opposite contact surface of the journal bush 216.

FIG. 4 shows, once again, the installation of the seal 100 in the bearing bush 222 in detail.

The reference sign 225 indicates the wall areas of the groove in the chock or the bearing bush, against which the seal 100 is pressed upon installation in the groove. In other words, the seal and the cavities on the surface of the seal are covered and sealed by such wall areas, if applicable. Only cavities or feed channels arranged radially further inwards open into the first annular gap 300.

Figure 4:
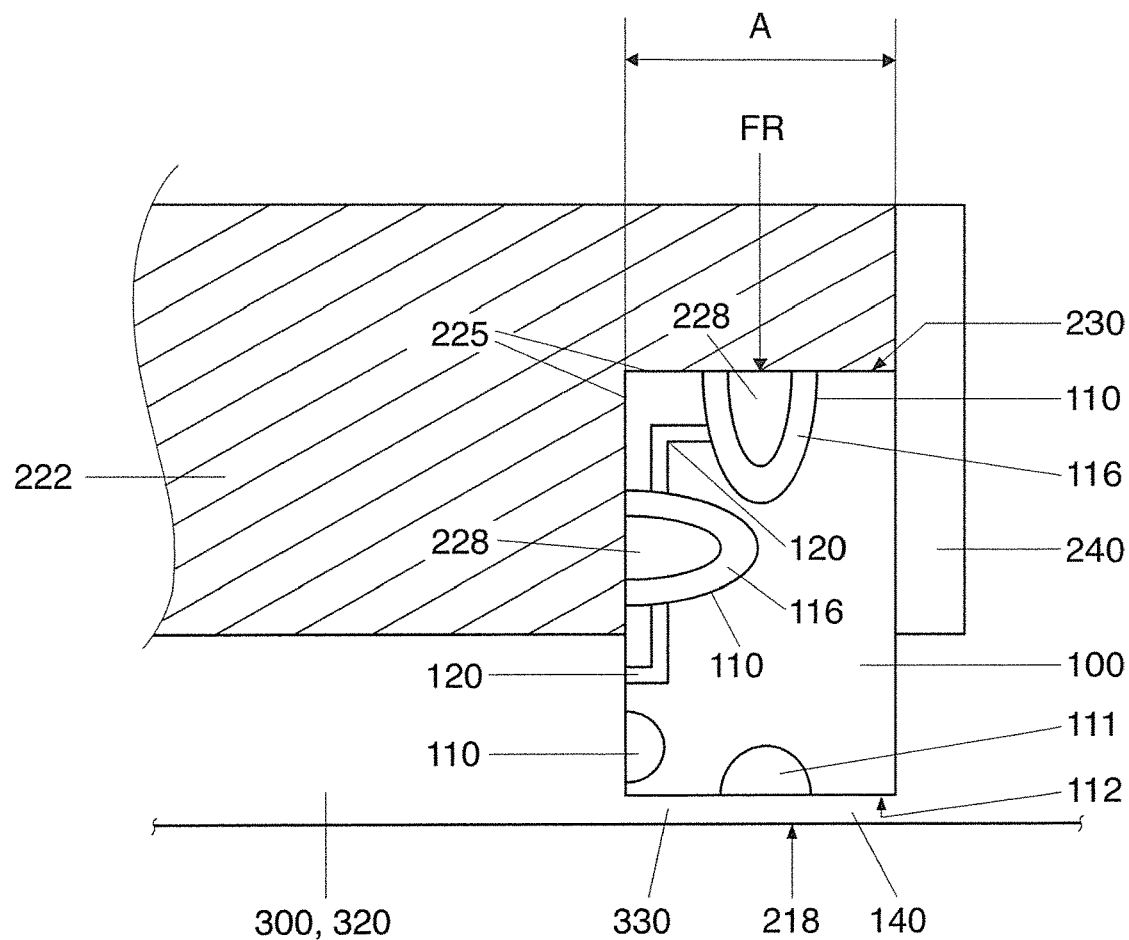
FIG. 4 shows the design and arrangement of the seal in the bearing arrangement as shown in FIG. 3 in an enlarged view.

It can also be seen that the thickness of the lubricating film 330 in the second annular gap 140 between the bottom face 112 of the seal 100 and the opposite contact surface 218 of the journal bush 216 is considerably less than the thickness of the annular gap 300. This is achieved by the fact that the ring seal 100 protrudes in the radial direction largely into the originally existing ring gap 300. In FIG. 4, the proportions are shown in an exaggerated manner. In fact, due to the radial pressing force FR, the ring seal presses on the contact surface 218 of the journal bush 216. However, due to the high pressure conditions mentioned above, the lubricating film 330 in question, with a thickness of only a few μm, nevertheless forms between the bottom face 112 and the contact surface 218. The pressure in the first annular gap 300 is significantly greater than that in the second annular gap 140.

It can also be seen that the ring seal 100 is inserted into the groove 230 in such a manner that its recesses 110 are engaged with pins 228, which extend from the end face of the bearing bush 222 bounding the groove 230, preferably in the axial direction R. With a design of radially arranged cavities, the pins extend perpendicular to the axial direction. The remaining cavity 116 is sealed towards the bearing bush 222 due to the axial or radial pressing force with which the ring seal 100 is pressed into the groove by means of the perforated disk 240; for this reason, it functions as a cavity 110 within the meaning of the disclosure, which cavity opens into the lubricant space 300 of the (oil film) bearing via a feed channel 120. The effect of the variation, in particular the increase, of the total radial force as a function of the pressure conditions in the area of the lubricating film 330, as caused by the feed channel, was described in detail above.

Figure 5:
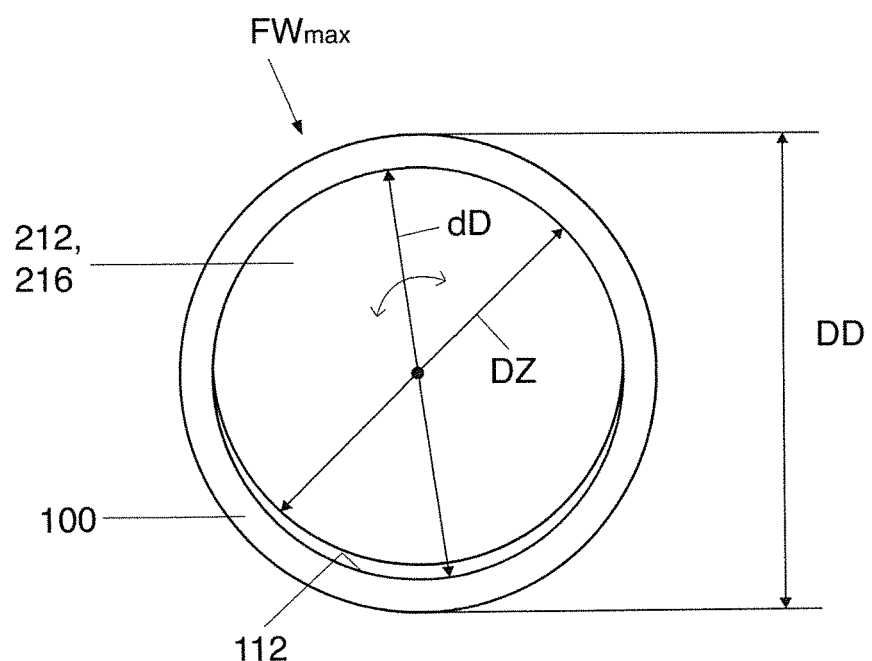
FIG. 5 shows a cross-section of the receiving space spread out by a bearing bush or chock with an inserted roll journal.

FIG. 5 has already been briefly described in the introduction. It shows a cross-section through the receiving space spread out by the bearing bush for receiving the roll journal 212. As can be seen from an overview of FIGS. 4 and 5, the receiving space is limited in the radial direction not only by the bearing bush 222, but in particular also by the ring seal 100, which typically protrudes further inwards. In the receiving space of the housing, the roll journal 212 rotates, if applicable with the drawn-on journal bush 216. For the operation of the roll bearing as a hydrodynamic oil film bearing, the inner diameter dD of the ring seal 100 is larger than the outer diameter DZ of the roll journal 212 at the axial level of the ring seal, optionally with the drawn-on journal bush 216. During operation as a hydrodynamic oil film bearing, the ring seal 100 then presses itself so closely against the surface or contact surface 218 of the roll journal that only the lubricating film 330 is formed there, only in the circumferential angular range of the minimum lubricating film, which is approximately in the area of the maximum rolling force $FW_{max}$. In the remaining circumferential angular range, the bottom face 112 of the ring seal 100 no longer abuts the contact surface 218 of the roll journal 212; rather, the distance between such two surfaces is greater than the thickness of the lubricating film in the area of the maximum rolling force; this applies in particular due to the overdimensioning in question of the ring seal 100. The overdimensioning in question and the resulting greater gap between the bottom face 112 and the contact surface 218 advantageously enables an axial outflow of lubricant in the circumferential angular range outside the area of the maximum rolling force. The outer diameter DD of the ring seal 100 typically corresponds to the inside diameter of the bottom of the groove 230.

LIST OF REFERENCE SIGNS

100 Seal
110 Cavity or recess
111 Bottom face pattern
112 Bottom face
116 Remaining cavity
120 Feed channel
130 Superelevation
140 Annular gap or lubricant space under the seal
200 Rolling stand
210 Roller
212 Roll journals
214 Roller body
216 Journal bush
218 Contact surface
220 Chock
222 Bearing bush
225 Wall areas of the groove
228 Pin
230 Groove
240 Perforated disk
245 Screw
300 Annular gap or lubricant space of the bearing
320 Lubricant
330 Lubricating film
a Width of the ring seal in the axial direction
A Width of the groove in the axial direction
DD Outer diameter of the ring seal DZ Outer diameter of roll journal, if applicable with journal bush
dD Inner diameter of the ring seal
R Axial direction
FR Radial pressing force on the seal
$FW_{max}$ Maximum rolling force.

The invention claimed is:

1. A rolling stand (200), comprising:
at least one roller (210) with two roll journals (212) and a roller body (214) for rolling a rolled material;
at least one chock (220) for rotatably supporting the roller (210) in the rolling stand (200),
wherein the chock (220) forms a receiving opening for receiving one of the roll journals (212),
wherein an inner diameter of the receiving opening is larger than an outer diameter of the roll journal in such a manner that, between the chock and the roll journal an annular gap (300) for receiving a lubricant (320) is formed; and
a seal for sealing the annular gap, which represents a lubricant space of a bearing, at least in a predetermined circumferential angular range, arranged in a non-rotatable manner relative to the rotatable roller at an end proximal to the roller body and/or at an end remote from the roller body of the chock (220);
wherein the seal (100) is at least partially formed from an elastic material,
wherein the seal has at least two cavities (110) which are separated from each other in a circumferential direction and which are independently open towards the lubricant space of the bearing for feeding the lubricant (320) from the lubricant space (300) of the bearing to be sealed into the cavities whereby the at least two cavities (110) can expand independently depending on different lubricant pressure in each of the at least two cavities (110),
wherein a groove (230) that is open towards the roll journal (212) and into which the seal (100) can be inserted is formed at the end proximal to the roller body and/or at the end remote from the roller body of the chock (220).

2. The rolling stand according to claim 1,
wherein the seal (100) is formed as a ring segment and has a predetermined limited length (L) to which the following applies:

L<total circumference of the annular gap.

3. The rolling stand according to claim 1,
wherein the seal (100) is designed in the form of a ring seal.

4. The rolling stand according to claim 3,
wherein an outer diameter (DD) of the ring seal in its unloaded state is essentially equal to a diameter of the groove (240) at its bottom.

5. The rolling stand according to claim 3,
wherein an inside diameter (dD) of the ring seal (100) is larger than an outside diameter (DZ) of the roll journal (212) at an axial height of the ring seal.

6. The rolling stand according to claim 1,
wherein an axial outer side of the groove is formed by a perforated disk (240) that can be detachably connected to the chock.

7. The rolling stand according to claim 1,
wherein the seal (100) has at least one superelevation (130) on its end face turned away from and/or turned towards the chock.

8. The rolling stand according to claim 1,
wherein the seal (100) has a rectangular cross-section; and in that the sealing surface of the seal is turned towards the roll journal.

9. The rolling stand according to claim 3,
wherein the at least two cavities (110) on the surface of the ring seal are also designed to be open towards the chock (220).

10. The rolling stand according to claim 9,
wherein the chock (220) has, on its end face turned towards the seal, pins (228) projecting in an axial or radial direction for engaging in the at least two cavities (110) on the surface of the seal (100).

11. The rolling stand according to claim 10,
wherein a volume of the at least two cavities (110) into which the pins project is greater than a volume of the pins (228) engaging in the at least two cavities.

12. The rolling stand according to claim 1,
wherein the seal does not include a circumferential groove to connect the at least two cavities (110).

13. The rolling stand according to claim 1,
wherein the seal (100) extends radially beyond the groove (230) with a bottom face (112) of the seal being arranged outside the groove (230), and
wherein each of the at least two cavities (110) is open towards the groove and in fluid communication with the lubricant space only through a dedicated feed channel (120) that opens towards the lubricant space on an inside face of the seal outside of the groove.

14. The rolling stand according to claim 1,
wherein pins (228) extend from the chock (220) into the cavities (110).

15. The rolling stand according to claim 1,
wherein in an unloaded state, an axial width (a) of the seal (100) is greater than a width (A) of the groove (230) in the axial direction (R).

16. The rolling stand according to claim 1,
further comprising a bearing bush (222) arranged in a non-rotatable manner in the chock (220).

17. The rolling stand according to claim 1,
further comprising a journal bush (216) drawn on the one of the roll journals (212).

* * * * *